Sept. 30, 1969  J. JONGBLOED ET AL  3,469,323
PROCESS AND DEVICE FOR SCREENING AND DRYING A PLASTICS
GRANULATE OBTAINED BY WET GRANULATION
Filed March 21, 1968
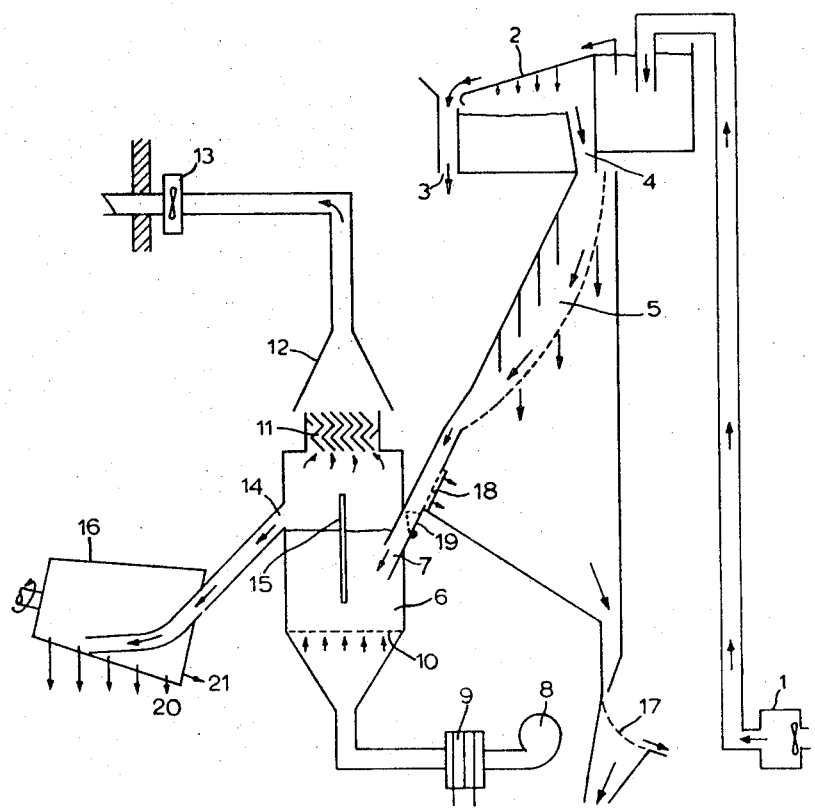
INVENTORS
JOHANNES JONGBLOED
JAN G. GARDENIERS
HUBERTUS W. NÜSSER
PIERRE H. PEETERS
By
Cushman, Darby & Cushman
ATTORNEYS United States Patent Office 3,469,323
Patented Sept. 30, 1969

3,469,323
PROCESS AND DEVICE FOR SCREENING AND DRYING A PLASTICS GRANULATE OBTAINED BY WET GRANULATION
Johannes Jongbloed, Hoensbroek, Jan G. Gardeniers, Valkenburg, Hubertus W. Nüsser, Born, and Pierre H. Peeters, Oirsbeek, Netherlands, assignors to Stamicarbon N.V., Heerlen, Netherlands
Filed Mar. 21, 1968, Ser. No. 714,984
Claims priority, application Netherlands, Mar. 25, 1967, 6704379
Int. Cl. F26b 3/06
U.S. Cl. 34—9                          13 Claims

ABSTRACT OF THE DISCLOSURE

Process and apparatus for screening and drying a thermoplastic granulate obtained by a wet granulation process wherein extruded hot thermoplastic granules are introduced into an aqueous cooling agent including feeding the mixture of granules and cooling agent to a sieve bend. The granules which are the oversize fraction of the sieve bend are then introduced into a fluid bed drier wherein residual surface moisture is removed from the granules. Thereafter the dried granules are screened to a predetermined size.

---

The present invention relates to a process and apparatus for screening and drying thermoplastic granules obtained in a wet granulation process. In a conventional wet granulation process to produce a thermoplastic granulate, extruded hot granules are released into a cooling liquid, usually water. The majority of the resulting cooled extruded granules generally are uniform in shape and size.

It has been found, however, that this process also yields considerable amounts of waste material such as dust, threads, and thermoplastic particle fines which are relatively inferior since their dimensions are smaller than 1 mm. This waste material generally has to be removed from the cooling fluid on water before the cooling fluid can efficiently be re-used in the wet granulation process. Additionally it has been found that the granulate contains, to a greater or less extent, agglomerations of granules often called clusters.

When the granules obtained by wet granulation are to be processed further for instance in extrusion or injection-moulding techniques, it is desirable to have sufficiently dry granules of virtually uniform size. It is recognized that extrusion processes can be more efficiently carried out when using uniformly sized plastic particles rather than granules of varied shape. The regularity of the shape of the granules renders it easier to supply and melt the same in the injection-moulding machine in a uniform manner.

It is therefore an object of the present invention to provide a process and apparatus for screening and drying granular thermoplastic polymers into a product that is particularly suitable for further processing.

It is commonly known that thermoplastic materials have to be dried very carefully, since these thermoplastic materials are sensitive to heat and liable to oxidise. The duration or extent of the drying operation must be controlled and this control is dependent on various factors, such as the nature of the thermoplastic material, its initial moisture content, and its permissible moisture content in the dried form. On the other hand, the temperature must not exceed a certain value, in order to prevent melting of the polymer or the impairment of its quality.

It has now been found that it is possible to subject a granulate of a thermoplastic material to the novel continuous combined screening and drying operations of this invention without any deleterious effect on the physical or chemical characteristics of the thermoplastic material.

According to the present invention, the extruded wet thermoplastic granulate, together with the water employed to form the same is continuously fed to a sieve bend to dewater the granules and to remove waste material therefrom as an undersize fraction. The oversize fraction of the sieve bend, i.e., the dewatered granules, is subjected to an after-treatment in a fluid-bed drier to which is delivered a fluidizing gas. Generally any amount of heat supplied to the granulate in the fluid bed drier by the fluidizing gas is usually less than the available internal heat of the granulate. The dried granulate is then screened to the desired size. Preferably, the extruded wet granulate is freed of any large agglomerates on a screen prior to delivery of the wet granulate to the sieve bend.

Wet granulation of a thermoplastic material is usually effected at a temperature higher than room temperature, but below 100° C. After the majority of the water has been removed by screening in a process according to the present invention, the remaining internal heat of the granules is usually still sufficient to evaporate the water on the surface of these granules.

However, if the water temperature is too low, and if the granulate has moreover been transported with water over a comparatively large distance, the internal heat of the granules will not longer be sufficient for the drying of the granulate in the fluid-bed drier. It then becomes necessary to preheat the fluiding gas before it is fed into the fluid bed. The moisture-absorbing capacity of the fluidizing air is greater the more strongly this air is heated. Naturally, the fluidizing gas must not be heated to a temperature above the softening or the decomposition temperature of the thermoplastic material.

The invention will be further elucidated with reference to the drawing which schematically shows the apparatus and method of this invention in screening and drying high density polyethylene granulate made in a conventional wet granulation process. Thermoplastic materials other than polyethylene can also be processed in the manner of this invention. Representative of such other thermoplastic materials are polypropylene, acetates, acrylics, polyamides, vinyls, polystyrenes and the like.

The polyethylene granules from granulator 1, having a particle size of about 4 mm., are pumped up in an amount of 40 kg. per one cubic metre of water at about 50° C. and are passed over a screen 2. (It will be recognized, of course, that the temperature of the water or other cooling fluid or agent can vary depending on the type and amount of thermoplastic material as well as the particular cooling fluid chosen.) Any granules caked into lumps or agglomerates having a dimension greater than e.g., 20 mm., for instance, are separated from the remainder by means of screen 2. These lumps are withdrawn from the system at 3. The undersize fraction of screen 2, which includes the remainder of the granules and water, is led to a feeding means 4 of sieve bend 5. This undersize fraction from screen 2 flows over sieve bend 5 under the influence of gravity. The greater part of the water supplied, about 99.9%, together with the finest thermoplastic particles pass through the sieve bend 5. Unlike the use of other types of screens, or separating devices, no clogging occurs in screening and dewatering the granulate on the sieve bend. The residence time of the granulate on the sieve bend is extremely short, generally less than about 1 second, so that the temperature of the granules leaving the sieve bend is still about 50° C. The moisture content of the granulate at this point is then about 2% by weight.

The substantially dewatered granulate which is the oversize fraction of sieve bend 5 is then continuously fed into fluid-bed drier 6 through duct 7. Adjacent the lower part of the discharge duct 7 there is provided an after-dewatering screen 18 for the removal of any splash water from the sieve bend 5 and any condensed water dripping from the walls.

A valve 19 is also provided which is used to divert the granulate from the normal circuit if desired or advisable. In normal operation, this valve 19 is positioned adjacent the lower portion of duct 7. A blower 8 passes the fluidizing gas which is preferably air in an amount of about 5,000 kg./h./m.$^2$, preferably at about 20° C., through the bed at a speed of about 1.2 m./s. (It will be recognized that gases other than air but which are inert with respect to the granulate material can also be used. Representative alternative gases include for instance, nitrogen.) In general, the residual internal heat of the granules is still sufficient to evaporate the water adhering to the surfaces of the granules. This evaporation will be effected more readily, the higher the temperature of the granules fed in and the lower the relative humidity of the fluidizing gas. A fluidizing gas heater 9 is provided for evaporating adhering moisture in case the internal heat of the granulate is insufficient. The drying process depends on the moisture-absorbing capacity of the fluidizing gas. For instance where the fluidizing gas is air the maximum water content of air increases with rising temperature and the moisture-absorbing capacity of the fluidizing air becomes greater as the air is heated more strongly. To prevent the polyethylene granules from melting, the temperature of the air under the fluid bed must not be too high and in practice this temperature is restricted to a maximum of about 80° C. At a higher temperature there is the risk of the polyethylene granules becoming too hot by contact with grating 10 and thus becoming soft. Consequently, air heater 9 need not have a large output.

In the fluid bed, nearly the entire surface of every granule is enveloped by the fluidizing gas. The evaporation of the moisture on the surface proceeds very rapidly. As the individual granules of the granulate are hardly in contact with each other in the bed and as no agglomerates can form owing to the rapid movement and the comparatively low temperature, no detrimental effect on the particle size is observed. In contrast with what would be expected, the granulate is dried very uniformly in this continuous procedure, in spite of the fact that the various granules do not have the same residence time in the bed. Also the abrasion of the granules in the bed is virtually nil.

To prevent the granules from being blown from the bed, this bed is provided with a conventional grating 11 consisting of zigzag plates that are so spaced that no granules are blown from the bed rectilinearly. Above the grating 11 there is provided air hood 12 and exhaust fan 13.

The feed of moist polymer granulate corresponds to an equally large discharge of dried product. This discharge is effected at outlet means 14. The fluid bed is divided into one or more compartments by one or more baffle plates 15, which prevents newly fed-in granules from flowing directly towards the discharge. The residence time of the granules in the fluid bed is generally about 5 minutes on the average. Additionally, the average moisture content of the granules leaving the bed at outlet 14 is only about 0.04% by weight or less.

The outlet pipe 14 of the fluid bed 6 communicates with a rotating drum screen 16 (shown schematically) by means of which the dried product is screened to size. The fractions obtained are discharged at 20 and 21, respectively. Screen 16 can have more than one deck, thus making it possible to screen the granules to various sizes.

The undersize fraction of sieve bend 5 is also passed, under the influence of gravity to a second sieve bend 17, the screening deck of which has a small slot width, e.g. 0.2 mm., and on which the fine polyethylene dust formed in the wet granulation process is here separated from the cooling and transport water. The moisture content of the polyethylene dust dewatered by the sieve bend 17 is at most about 25%.

The invention provides a simple and reliable method for rapidly and effectively drying and screening a continuous flow of a thermoplastic granulate material. The apparatus according to this invention has no moving parts, except for an air fan and a drum screen thereby advantageously providing low energy consumption per ton of dried and screened product.

What is claimed is:

1. A process for screening and drying a thermoplastic granulate material obtained by a wet granulation process wherein extruded hot thermoplastic granules are introduced into an aqueous cooling agent comprising the steps of continuously feeding the resulting mixture of thermoplastic granules and aqueous cooling agent to a sieve bend to separate substantially the thermoplastic granules from the aqueous cooling agent, introducing the resulting separated thermoplastic granules into a fluid-bed drier, contacting said thermoplastic granules with a fluidizing medium in said drier whereby moisture adhering to the surface of said granules is substantially removed.

2. The process of claim 1 which includes feeding said resulting mixture of thermoplastic granules and aqueous cooling agent to further screening means prior to feeding the same to said sieve bend.

3. The process of claim 1 which includes heating said fluidizing medium prior to contacting said thermoplastic granules with the same in said fluid bed drier.

4. The process of claim 1 which includes feeding the aqueous cooling agent separated from said thermoplastic granules to a second sieve bend to separate therefrom undersized thermoplastic particles.

5. The process of claim 1 wherein the thermoplastic granules are polyethylene.

6. The process of claim 1 wherein the temperature of the cooling agent is sufficient so that the residual internal heat of the thermoplastic granules separated from said cooling agent and introduced into the fluid bed drier is sufficient to evaporate substantially the residual moisture adhering to the surface of said granules.

7. The process of claim 6 wherein the cooling agent is at a temperature of about 80° C.

8. The process of claim 1 wherein the fluidizing medium is air and wherein the air is maintained at a temperature of about 20° C.

9. The process of claim 1, which includes the final step of screening the resulting dried granules to the desired size.

10. Apparatus for screening and drying a thermoplastic granulate material obtained by a wet granulation process wherein extruded hot thermoplastic granules are introduced into an aqueous cooling agent comprising in combination a sieve bend, means for delivering the resulting mixture of thermoplastic granules and cooling agent to said sieve bend whereby said thermoplastic granules are separated from said cooling agent, the thermoplastic granules constituting the oversize fraction of said sieve bend and the cooling agent constituting the undersize fraction of said sieve bend, a fluid bed drier, means communicating between the oversize discharge end of said sieve bend and the inlet of said fluid bed drier to introduce the sieve bend oversize fraction into said fluid bed drier, means for delivering a fluidizing gas to said fluid bed drier, screening means and means communicating between the outlet of said fluid bed drier and said screening means to deliver dried thermoplastic granules to said screening means wherein said granules are separated into a predetermined size.

11. The apparatus of claim 10 including further screening means upstream of said sieve bend, means for delivering said resulting mixture of thermoplastic granules and cooling agent to said further screening means and means for delivering the underflow of said further screening means to said sieve bend.

12. The apparatus of claim 10 wherein said screening means is a rotary drum screen.

13. The apparatus of claim 10 including a further sieve bend, and means for delivering the undersize fraction of said sieve bend to said further sieve bend.

References Cited

UNITED STATES PATENTS

| | | | |
|---|---|---|---|
| 1,914,877 | 6/1933 | Wright | 34—61 |
| 2,636,575 | 4/1953 | Watson | 34— 13 X |
| 3,048,930 | 8/1962 | Holzrichter et al. | |
| 3,349,499 | 10/1967 | Toshio Katano | 34—10 |

JOHN J. CAMBY, Primary Examiner

U.S. Cl. X.R.

34—13, 57